Aug. 23, 1932.                R. E. JOHNSON                 1,873,416
                              BALANCING MACHINE
                          Filed Feb. 18, 1930           2 Sheets-Sheet 1
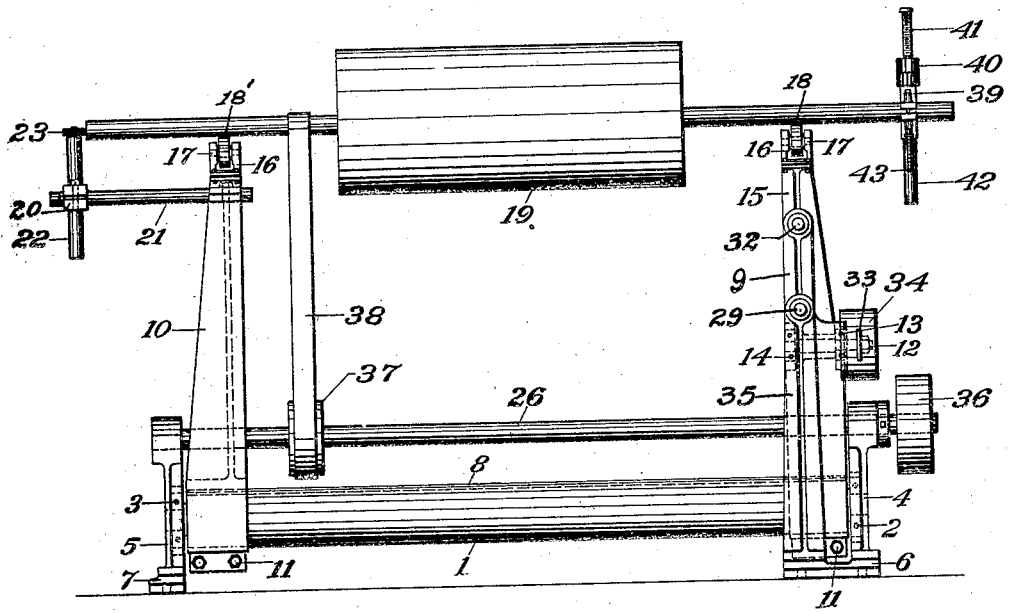
Fig.1.
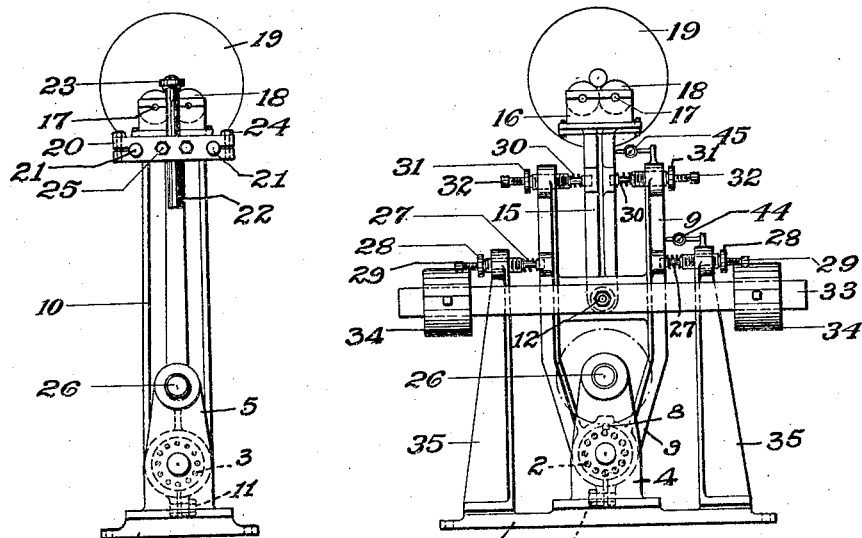
Fig.3.                                Fig.2.
Inventor
Ruben E. Johnson
Fred C. Matheny
Attorney Aug. 23, 1932.        R. E. JOHNSON        1,873,416
BALANCING MACHINE
Filed Feb. 18, 1930        2 Sheets-Sheet 2

Inventor
Ruben E. Johnson
Fred C. Matheny
Attorney.

Patented Aug. 23, 1932

1,873,416

UNITED STATES PATENT OFFICE

RUBEN E. JOHNSON, OF SEATTLE, WASHINGTON

BALANCING MACHINE

Application filed February 18, 1930. Serial No. 429,307.

My invention relates to balancing machines and is in the nature of an improvement in the balancing machine disclosed in United States Letters Patent No. 1,481,785 issued to Nicholas W. Akimoff on January 29, 1924.

The principal object of my invention is to provide a novel and improved type of machine for testing rotatable machine elements of varied diameters to quickly determine the location and value of static and dynamic unbalance therein.

Another object contemplates the provision of a machine in which the machine element to be tested may be mounted and rotated in suitable supporting devices of a novel construction and arrangement whereby the machine element being tested may be permitted to alternately oscillate in two degrees of freedom either of which may be suppressed at will, so that the machine element may be tested in a single machine for the ascertainment of the location and value of both static and dynamic unbalance, and which when permitted to oscillate simultaneously in both degrees of freedom will show whether or not all the proper corrections have been made for the elimination of such unbalance, both static and dynamic.

Another object is to provide new and novel means whereby the moments of inertia of the oscillator supporting devices may be arbitrarily varied for the purpose of better synchronizing the periods of oscillation of the oscillatory supporting devices with the speed of rotation of the machine element to thereby accentuate the static or dynamic unbalance existing therein and thus facilitate the determination of the location and value thereof.

Another object is to provide means for stabilizing or centrally locating the oscillatory supporting devices which incidentally act to modify the respective periods of oscillation of said supporting devices, and which means are also provided with improved means for varying their respective tensions whereby the proper synchronizing of the respective periods of oscillation of said supporting devices will not be interfered with.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:

Figure 1 is a view in front elevation of my balancing machine embodying my invention.

Fig. 2 is a view in elevation of one end of said balancing machine.

Fig. 3 is a view in elevation of the other end of my balancing machine.

Figures 4, 5:
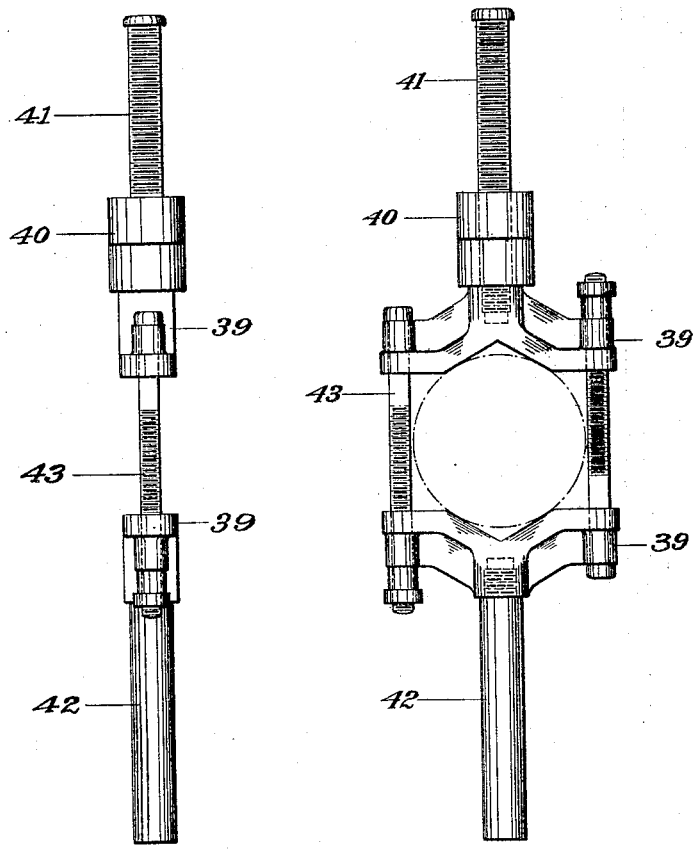
Fig. 4 is an enlarged view in front elevation of a detail of my invention.
Fig. 5 is an enlarged view in side elevation of the same detail shown in Fig. 4.

Referring to the drawings, throughout which like reference numerals indicate like parts, 1 is a shaft that is reduced at each end to fit the ball and roller bearings 2 and 3 which are suitably supported in the brackets 4 and 5 which brackets are secured to and supported by the base plates 6 and 7. The shaft 1 is free to oscillate in the bearings 2 and 3. A key 8 is disposed in keyways cut in the yoke 9 and pedestal 10 both of which are bored to fit the shaft 1. Flanged projections at the bottom of the yoke 9 and pedestal 10 have a saw cut on the vertical central line, as illustrated in Figs. 2 and 3. Screw bolts 11 serve to clamp the yoke 9 and pedestal 10 rigidly to the shaft 1 when adjusted to the desired position lengthwise of shaft 1. Yoke 9 after once being adjusted remains in its adjusted position while pedestal 10 may be adjusted to suit the length of the machine element to be tested.

A spindle 12 carries the ball or roller bearings 13 and 14, the outer races of which are supported by and secured to yoke 9. The spindle 12 in turn is rigidly and non-rotatively secured to and supports a vertical arm 15 and serves as a fulcrum about which said arm 15 may oscillate as hereinafter described.

Figures 6, 7:
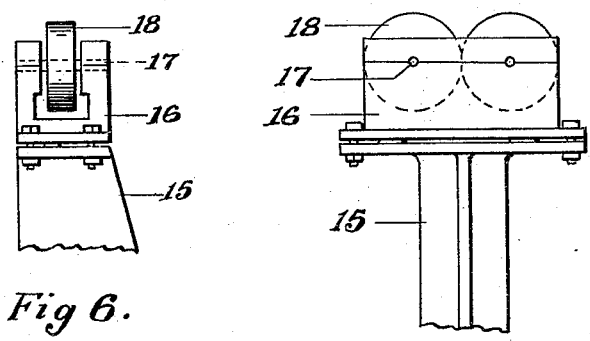
Figs. 6 and 7 are enlarged views of another detail of my invention.

The U-shaped blocks 16 are bolted to the vertical arm 15 and pedestal 10 respectively. These bolts may be removed and the blocks 16 may be shimmed to level the machine element to be tested, as shown in Figs. 6 and 7. Mounted on the blocks 16 are spindles 17 on which are mounted the rollers 18 and 18. The machine element to be tested 19 is mounted on the rollers 18 as shown in Fig. 1. 20 is a thrust yoke supported on the rods 21 to adjustably support the vertical rod 22 at the top of which is mounted the roller 23 which roller is adapted to be adjusted both vertically and horizontally to bear against the end of the shaft of the machine element 19. The vertical adjustment is accomplished by loosening clamping screws 25 and sliding rod 22 vertically in adjusting block 20. When the desired height has been reached clamping screws 25 are secured. The horizontal movement or adjustment of said roller is accomplished by loosening clamping screws 24 and slidably adjusting block 20 along rods 21. When the proper adjustment has been obtained clamping screws 24 are secured. In this connection it is to be noted that the clamping action of screws 24 and 25 is made possible by suitably slotting block 20 and allowing the sections thus separated to be clamped rigidly against the respective rods 21 and 22. Rods 21 are supported on pedestal 10, preferably by suitable releasable clamp means. Based upon the assumption that it is physically impossible to so accurately align rollers 18 as to prevent any endwise travel or crawling of the machine element being tested, this element is revolved in a direction to cause the endwise travel to be toward thrust roller 23. By revolving machine element 19 in the proper direction, which may readily be determined by trial, roller 23 will therefore prevent any endwise movement of said element.

Vertical brackets 35 are rigidly secured to the base plate 6. Threadably mounted on the upper end of the brackets 35 are two screws 28. Stop screws 29 are threaded through the screws 28. Mounted on the end of the screws 28 are two springs 27 which bear against the two forks of the yoke 9. The amount of compression of springs 27 is adjustable by means of the screws 28. The stop screws 29 serve either to limit the amplitude of vibration of the yoke 9 with its associated parts or to lock the yoke 9 and its associated parts against the brackets 35 and thus constrain the frame 9 from oscillating.

Mounted on the upper extremity of the arms of the yoke 9 are the screws 31 and threaded therein are screws 32 which are adapted to bear against both sides of the vertical arm 15. Mounted on the screws 32 are the springs 30, the compression of which is adjustable by the screws 32. The screws 32 being adapted to serve either to limit the amplitude of vibration of the vertical arm 15 or to lock said arm with the yoke 9.

A flat bar 33 is fixedly and non-rotatively secured to the spindle 12 and serves as a pendulum arm for supporting two similar weights 34. These weights 34 are provided for arbitrarily varying the rate or period of oscillation of either the vertical arm 15 or the frame 10 with its associated parts. Adjustment of the weights 34 toward the fulcrum 12 increases the rate of vibration at which synchronism is reached.

A drive shaft 26 is suitably mounted in the brackets 4 and 5 and carries two pulleys 36 and 37. The pulley 36 may be connected by a belt to any desired source of power, such as an electric motor capable of revolving at variable speeds, while pulley 37 is connected by a belt 38 with the machine element 19.

A universal balancing clamp is shown in Figs. 4 and 5 that is adapted to fit shafts of any ordinary size and is used for the purpose of setting up a determinable centrifugal force to counterbalance the centrifugal forces that are created by the unbalance in the machine element that is being tested. Said clamp comprises corresponding jaws 39. An adjustable member 40 of known weight and dimensions is threadedly disposed on a spindle 41 that is centrally threaded into one of said jaws while a counterweight spindle 42, that is designed to exactly counterbalance the combined weights of the member 40 and spindle 41, when the clamp is adjusted to a shaft of any size, is correspondingly threaded into the other jaw. The jaws are connected by two corresponding bolts 43 for securing the balancing clamp on shafts or other machine elements of various dimensions as will be understood.

The numerals 44 and 45 designate dial gauges of ordinary and well known construction that are here used for the purpose of determining by reading the amplitude of the vibrations that are set up in testing machine elements as more fully hereinafter set forth.

In the practical application of my device its operation is as follows:—

The shaft of machine element 19 to be tested is placed upon the rollers 18, as shown with one end of said shaft bearing upon the roller 23 thereby preventing any movement endwise. If it is found that the machine element is not level the unevenness may be adjusted by putting shims under the U shaped blocks 16. The set screws 32 are now screwed down so that they each bear against the vertical arm 15 thus locking the oscillatory vertical arm 15 against movement. The stop screws 29 located on the upper end of the brackets 35 are retracted so as to permit the yoke 9 and associated shaft 8 to oscillate on the shaft bearings 2 and 3. The balancing clamp, shown in Figs. 4 and 5, having previously been placed upon one end of the shaft of the machine element. The power is then caused to operate the drive shaft 26 through the pulley 36 driving the pulley 37 and the machine element 19 through the belt 38 and shaft of the machine element. By successive trials with the balancing clamp secured in various positions angularly about the shaft and after the clamp weight 40 has been properly adjusted radially along spindle 41 the balancing clamp will be finally brought to a condition where the same will counteract any static unbalance existing in the machine element 19. The speed of rotation may be varied by any well known means, not shown, to approximate the speed of rotation of said machine element to that of the period of free oscillation of the yoke 9 and the parts carried thereby. The shiftable weights 34 provide means for varying the period of free oscillation of the yoke 9 and the parts carried thereby by changing the moment of inertia.

The springs 27 which serve to normally maintain the yoke 9 in a central location may be varied in the tension by means of the screws 28 so as to adjust the same to the desired period of free oscillation and thus facilitate the ready observation of the desired standard of unbalance which is indicated by the dial gauge 44.

After the angular location and extent of the static unbalance existing in the machine element 19 has been indicated by observing the angular location of the counterbalancing device and also measuring the amount of offcenter adjustment thereof, the static unbalance can then be readily eliminated by removing the required equivalent amount of material on the heavy side of the machine element or by the addition of a similar mass on the light side.

When the machine element 19 has thus been brought to a condition of substantially perfect static balance, it is again replaced in the machine and the set screws 29 are then screwed against the yoke 9 to thus lock the same against oscillation and the set screws 32 carried at the upper end of the yoke 9 are then retracted so as to permit the end of the shaft supported by the rollers 18 to oscillate latterly. The universal balancing device is again placed in position on the end of the shaft of the machine element nearest to the yoke 9 and said machine element is again rotated in the same manner as before mentioned and the angular location and extent of dynamic unbalance existing therein is then ascertained through successive trial and by angular and offcenter adjustment of the universal balancing device. The moment of inertia of the vertical arm 15 and the parts carried thereby may be varied by shifting the weights 34 on the flat bar 33, and the springs 30 which normally serve to locate the vertical arm 15 in a central position may be varied in their tension by the adjusting screws 31 so as to synchronize the period of free oscillation of the vertical arm 15 and the parts carried thereby with the speed of rotation of the machine element 15.

When the universal balancing device is finally brought to a condition where the existing dynamic unbalance is substantially counteracted, the angular and longitudinal position of the same is observed, as well as the amount of offcenter displacement thereof, so that the operator may then determine the equivalent amount of material to be removed or added at proper places to eliminate said dynamic unbalance.

It will be obvious that I have provided a balancing machine in which the location and value of both static and dynamic unbalance existing in a rotatable machine element may be readily determined and said machine embodies supporting devices which are so arranged and constructed that the machine element may be easily permitted to alternatively oscillate in two degrees of freedom, either of which may be controlled at will by the operator and which embodies accessible means for completely synchronizing the period of free oscillation of the supporting devices and the parts carried thereby with the speed of rotation of the machine element being tested so that accuracy will be insured.

It will be obvious from the foregoing that I have provided a balancing machine that is novel in its plan of construction and is so arranged that all adjustments to be made thereon are within easy reach of the operator and said machine will support and rotate machine elements having very large dimensions, in both length and diameter.

What I claim is:—

1. A balancing machine for determining the location and value of static and dynamic unbalance existing in a rotatable machine element, embodying a horizontal shaft, antifriction bearing means supporting said shaft for free and easy oscillation, an upright yoke secured to said shaft, an upright pedestal secured to said shaft in spaced relation from said yoke, and means for rotatably supporting a machine element from said pedestal and said yoke.

2. A balancing machine for determining the location and value of static and dynamic unbalance existing in a rotatable machine element, embodying a horizontal shaft, antifriction bearings supporting said shaft for oscillation, an upright yoke secured to said shaft, an upright pedestal secured to said shaft in spaced relation from said yoke, means for rotatably supporting a machine element from the upper portion of said pedestal and said yoke and means for rotating said machine element.

3. A balancing machine for determining the value of static and dynamic unbalance existing in a rotatable machine element, embodying a horizontal shaft, ball bearings supporting the ends of said shaft for free and easy oscillation, an upright pedestal and an upright yoke secured to said shaft and adjustable along said shaft toward and away from each other, means for maintaining correct alignment of said pedestal and said yoke on said shaft, means for rotatably supporting a machine element at the upper ends of said yoke and said pedestal, and means for rotating said machine element.

4. A balancing machine for determining the value of static and dynamic unbalance existing in a rotatable machine element, embodying a horizontal shaft, antifriction bearings supporting the ends of said shaft for free and easy oscillation, a yoke secured on said shaft near one end, a pedestal secured on said shaft and adjustable along said shaft toward and away from said yoke, means on said pedestal and said yoke for supporting a machine element for rotation on a horizontal axis, and means for rotating said machine element.

5. A balancing machine for determining the value of static and dynamic unbalance existing in a rotatable machine element, embodying a horizontal shaft, antifriction bearings supporting said shaft for oscillation, an upright yoke fixedly secured to said shaft, an upright pedestal non-rotatably secured to said shaft and spaced from said yoke, a vertical arm pivotally mounted on said yoke and means on the top end of said pedestal and said vertical arm respectively for rotatably supporting a machine element.

6. A balancing machine for determining the value of static and dynamic unbalance existing in a rotatable machine element, embodying a horizontal shaft, antifriction bearings supporting said shaft for oscillation, an upright yoke fixedly secured to said shaft, an upright pedestal non-rotatably secured to said shaft and spaced from said yoke, a vertical arm pivotally mounted on said yoke, means for limiting or entirely suppressing the vibratory movement of said vertical arm relative to said yoke, means on said vertical arm and said pedestal for supporting a machine element for rotation on a horizontal axis and means for rotating said machine element.

7. A balancing machine for determining the value of static and dynamic unbalance existing in a rotatable machine element, embodying a horizontal shaft, antifriction bearings supporting said shaft for oscillation, an upright yoke fixedly secured to said shaft, an upright pedestal non-rotatably secured to said shaft and spaced from said yoke, a vertical arm pivotally mounted on said yoke, means for limiting or entirely suppressing the vibratory movement of said vertical arm relative to said yoke, means for limiting or entirely suppressing the vibratory movement of said yoke and means for rotatably supporting a machine element from the upper portions of said vertical arm and said pedestal.

8. In a balancing machine for determining the value of static and dynamic unbalance existing in a rotatable machine element, a horizontal shaft, antifriction bearing brackets supporting the ends of said shaft, an upright U shaped yoke and an upright pedestal non-rotatably secured to said shaft and capable of adjustment along said shaft toward and away from each other, key means on the shaft for maintaining alignment of said pedestal and said yoke, a vertical arm pivotally mounted mid way between the two arms of said yoke, means for limiting or entirely suppressing the vibratory movement of said yoke, a cross bar fixedly connected with the pivot of said vertical arm, adjustable weights on said cross bar and means on the upper ends of said pedestal and said vertical arm for supporting a machine element for rotation.

9. In a balancing machine for determining the value of static and dynamic unbalance existing in a rotatable machine element, a horizontal shaft, antifriction bearing brackets supporting the ends of said shaft, an upright U shaped yoke and an upright pedestal non-rotatably secured to said shaft and capable of adjustment along said shaft toward and away from each other, a vertical arm pivotally mounted by an antifriction bearing mid way between the two arms of said yoke, means for limiting or entirely suppressing the vibratory movement of said vertical arm relative to said yoke, rigid supports at the sides of said yoke, means on said supports for limiting or entirely suppressing the vibratory movement of said yoke, roller means on the top of said vertical arm and said pedestal for rotatably supporting a rotary machine element and means for rotating said machine element.

10. In a balancing machine for determining the location and value of static and dynamic unbalance existing in a rotatable machine element, a horizontal shaft supported for free and easy oscillation, an upright yoke and an upright pedestal non-rotatably secured on said shaft in spaced apart relation, means for limiting or entirely suppressing the vibrations of said yoke and pedestal, means on said yoke and said pedestal for rotatably supporting a machine element with its axis horizontal, means for rotating said machine element, and thrust means for preventing endwise movement in one direction of said machine element.

11. The apparatus as claimed in claim 10 in which the thrust means is in the nature of a roller mounted on a bracket which is horizontally and vertically adjustable and is supported from the pedestal whereby the roller may engage the end of the machine element.

12. A balancing machine for determining the location and value of static and dynamic unbalance existing in a rotatable machine element, embodying base means, bearing brackets extending upwardly from said base means, horizontally aligned antifriction bearings in said bearing brackets, a horizontal shaft supported for oscillation in said antifriction bearings, an upright U shaped yoke non-rotatably secured to said shaft near one end, an upright pedestal non-rotatably secured to said shaft and adjustable along said shaft toward and away from said yoke, a vertical arm pivoted between the two arms of said yoke, means for limiting or entirely suppressing vibratory movement of said vertical arm relative to said yoke, a cross bar rigidly connected with the pivoted end of said vertical arm, weights adjustable on said cross bar, rigid supports at the sides of said yoke, means connected with said supports for limiting or entirely suppressing vibratory movement of said yoke, means for indicating the vibration of said yoke, other means for indicating the vibration of said vertical arm, roller means at the top of said vertical arm and said yoke for supporting a rotary machine element, means for preventing endwise movement in one direction of said machine element, a driving shaft journaled in said brackets just above said first named shaft, and means for driving said machine element from said driving shaft.

13. In a balancing machine for determining the location and value of static and dynamic unbalance existing in a rotatable machine element, a vibratory frame embodying two spaced apart upright members supported from a common shaft, means supporting a machine element for rotation in said frame, means for rotating said machine element, and a clamp for attachment to said machine element to counteract static and dynamic unbalance, said clamp comprising two similar jaw members angularly recessed to fit cylindrical objects of different size, two similar bolts for clamping said jaw members onto a cylindrical object, an adjustable weight projecting from one of said jaw members and a non-adjustable counterweight projecting from the other jaw member.

14. A clamp for use with a balancing machine for determining the location and value of static and dynamic unbalance existing in a rotatable machine element, embodying two similar jaw members, an adjustable weight on one of said jaw members a non-adjustable counterweight on the other jaw member said weight and counterweight being exactly balanced irrespective of the spread of the clamp when the weight is in fully retracted position and bolts for clamping said two jaw members onto a cylindrical machine element.

In testimony whereof I affix my signature.

RUBEN E. JOHNSON.